(12) United States Patent
Lin

(10) Patent No.: US 8,302,655 B2
(45) Date of Patent: Nov. 6, 2012

(54) SPRING DRIVE DEVICE FOR A SUNSHADE ASSEMBLY

(75) Inventor: Paul Lin, Tainan (TW)

(73) Assignee: Macauto Industrial Co., Ltd. (TW)

( * ) Notice: Subject to any disclaimer, the term of this patent is extended or adjusted under 35 U.S.C. 154(b) by 50 days.

(21) Appl. No.: 13/049,626

(22) Filed: Mar. 16, 2011

(65) Prior Publication Data

US 2012/0234956 A1 Sep. 20, 2012

(51) Int. Cl.
*E06B 9/56* (2006.01)

(52) U.S. Cl. .......................... 160/315; 160/314; 160/313

(58) Field of Classification Search .................. 160/315, 160/305, 191, 192, 313, 314, 316, 323.1, 160/370.22, 294, 299, 301
See application file for complete search history.

(56) References Cited

U.S. PATENT DOCUMENTS

| | | | | |
|---|---|---|---|---|
| 1,766,746 A | * | 6/1930 | Heckman | 160/315 |
| 1,905,980 A | * | 4/1933 | Burns | 160/301 |
| 1,912,379 A | * | 6/1933 | Matt | 160/292 |
| 4,403,641 A | * | 9/1983 | Reeder | 160/263 |
| 4,668,001 A | * | 5/1987 | Okumura et al. | 296/37.16 |
| 5,464,052 A | * | 11/1995 | Wieczorek et al. | 160/23.1 |
| 5,934,354 A | * | 8/1999 | Price et al. | 160/370.22 |
| 6,715,525 B2 | * | 4/2004 | Ehrenberger et al. | 160/23.1 |
| 7,254,868 B2 | * | 8/2007 | Mullet et al. | 16/198 |
| 7,694,712 B2 | * | 4/2010 | Schimko et al. | 160/315 |
| 8,156,993 B2 | * | 4/2012 | Kao | 160/321 |
| 2005/0126723 A1 | * | 6/2005 | Arnoux et al. | 160/313 |
| 2005/0257903 A1 | * | 11/2005 | Schimko et al. | 160/370.22 |
| 2008/0190572 A1 | * | 8/2008 | Kwak | 160/313 |
| 2008/0314533 A1 | * | 12/2008 | Park | 160/313 |
| 2009/0308545 A1 | * | 12/2009 | An | 160/313 |
| 2011/0005694 A1 | * | 1/2011 | Ng | 160/311 |
| 2011/0209837 A1 | * | 9/2011 | Wieczorek et al. | 160/314 |
| 2011/0240235 A1 | * | 10/2011 | Lin | 160/314 |
| 2011/0272106 A1 | * | 11/2011 | Mullet et al. | 160/311 |

* cited by examiner

*Primary Examiner* — Katherine w Mitchell
*Assistant Examiner* — Johnnie A Shablack
(74) *Attorney, Agent, or Firm* — Brinks Hofer Gilson & Lione

(57) ABSTRACT

A spring drive device is for use with a sunshade assembly which includes a coupling shaft coaxial to and rotatable with a winding shaft and formed with a guided path. The spring drive device includes a spring member disposed in and connected to a shell unit. A connecting shaft is formed with a guideway which has an initial region engaged with the spring member, such that when the connecting shaft is moved along a coupling route, the guideway is kept in slidable engagement with the spring member until a relay region of the guideway reaches the spring member. The connecting shaft is engageable with the coupling shaft to align the guided path with the guideway such that when the movement of the connecting shaft is continued after the relay region reaches the spring member, the guided path is brought to take over the slidable engagement with the spring member.

10 Claims, 7 Drawing Sheets

SPRING DRIVE DEVICE FOR A SUNSHADE ASSEMBLY

BACKGROUND OF THE INVENTION

1. Field of the Invention

The invention relates to a spring drive device, more particularly to a spring drive device for a sunshade assembly.

2. Description of the Related Art

A sunshade assembly generally comprises a pair of spaced-apart mounting seats, a winding shaft connected rotatably to the mounting seats, and a shade member wound on and having one end connected to the winding shaft. One of the mounting seats includes a spring member disposed therein. The spring member has one end secured to the one of the mounting seats, and an opposite end connected to the winding shaft. When the shade member is unwound, the winding shaft rotates to twist the spring member, so that the winding shaft can rotate stably under a restoring force of the spring member. In addition, before being assembled to the respective mounting seat, the spring member is twisted so as to have a restoring force stored therein, such that the shade member can be tightly stretched when being unwound, even in the case where the extent of unwinding of the shade member is minimal.

U.S. Pat. No. 7,694,712 B2 discloses a conventional spring drive assembly of a sunshade. The conventional spring drive assembly comprises a coil spring and a coupling shaft. The coupling shaft has one end connected co-rotatably to a winding shaft via a bushing, and an opposite end engaging separably an end segment of the coil spring. As such, when the winding shaft is rotated, the spring member will simultaneously be twisted. A securing pin and a spring clip are provided to prevent the coupling shaft from moving longitudinally, thereby maintaining the engagement between the coupling shaft and the spring member.

SUMMARY OF THE INVENTION

The object of the present invention is to provide a spring drive device which can be easily assembled to a sunshade assembly, and which has a relatively simple structure.

Accordingly, a spring drive device of the present invention is adapted for use in a sunshade assembly. The sunshade assembly includes a winding shaft, a shade member that is wound on the winding shaft, and a coupling shaft that has a coupling end coaxial to and rotatable with the winding shaft, and an engaging end opposite to the coupling end, and that is formed with a guided path extending longitudinally from the engaging end toward the coupling end. The spring drive device comprises a shell unit, a spring member, and a connecting shaft. The shell unit defines a retaining space that extends along an axis, and includes an outer side wall. The spring member is disposed in the retaining space, and has a first segment that is connected to the shell unit, and a second segment that is inwardly and radially spaced apart from the first segment. The connecting shaft includes a shaft body which has a central part disposed in the retaining space, an outer end extending outwardly of the outer side wall of the shell unit, and an inner end longitudinally opposite to the outer end. The shaft body is formed with a positioning section at the inner end, and a guideway which has an initial region that is slidably engaged with the second segment, and which extends longitudinally from the initial region to terminate at a relay region, such that when the shaft body is moved axially along a coupling route in a direction of the axis, the guideway is kept in slidable engagement with the second segment until the relay region reaches the second segment. The shaft body is angularly displaceable relative to the axis between an unlocked position, where the shaft body is permitted to move axially along the coupling route, and a locked position, where the axial movement of the shaft body is arrested. The positioning section of the connecting shaft is adapted to be engageable with the engaging end of the coupling shaft to align the guided path of the coupling shaft with the guideway such that when the axial movement of the shaft body is continued after the relay region reaches the second segment, the guided path is brought to take over the slidable engagement with the second segment from the relay region while the guided path retrieves the coupling route. The shell unit further includes a retaining member disposed on the outer side wall for retaining the outer end of the shaft body at the locked position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
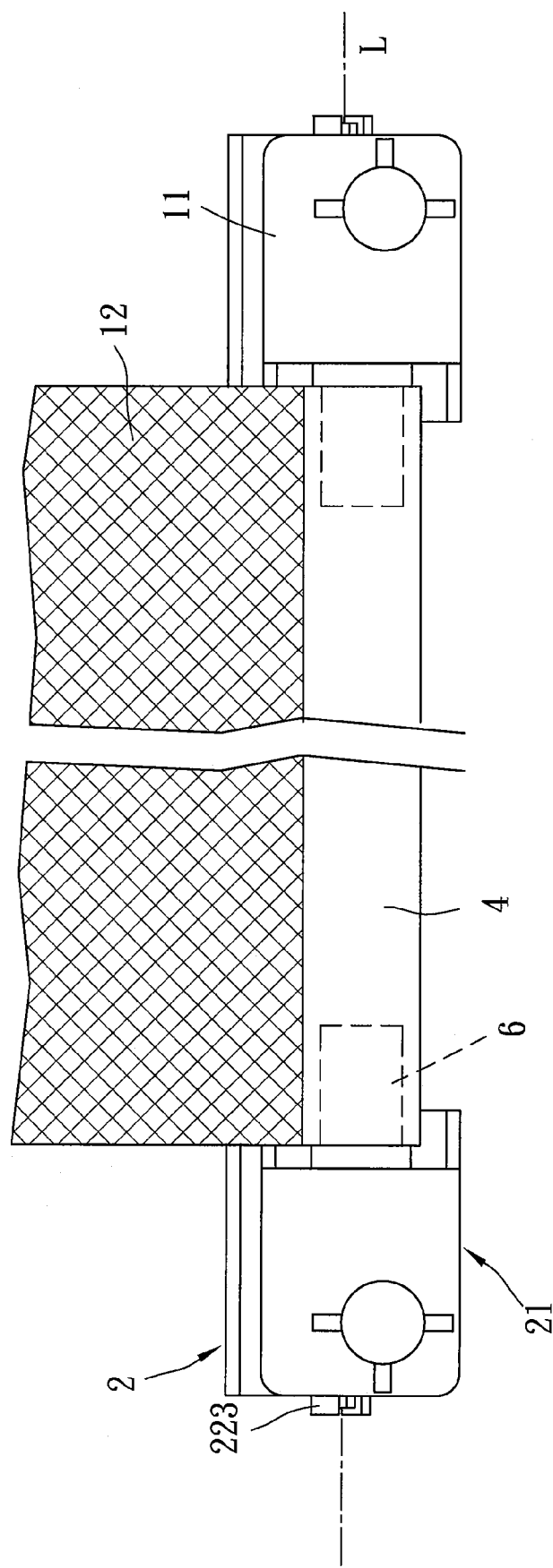
FIG. 1 is a fragmentary schematic view of a sunshade assembly mounted with a preferred embodiment of a driving device according to the invention.
Figure 2:
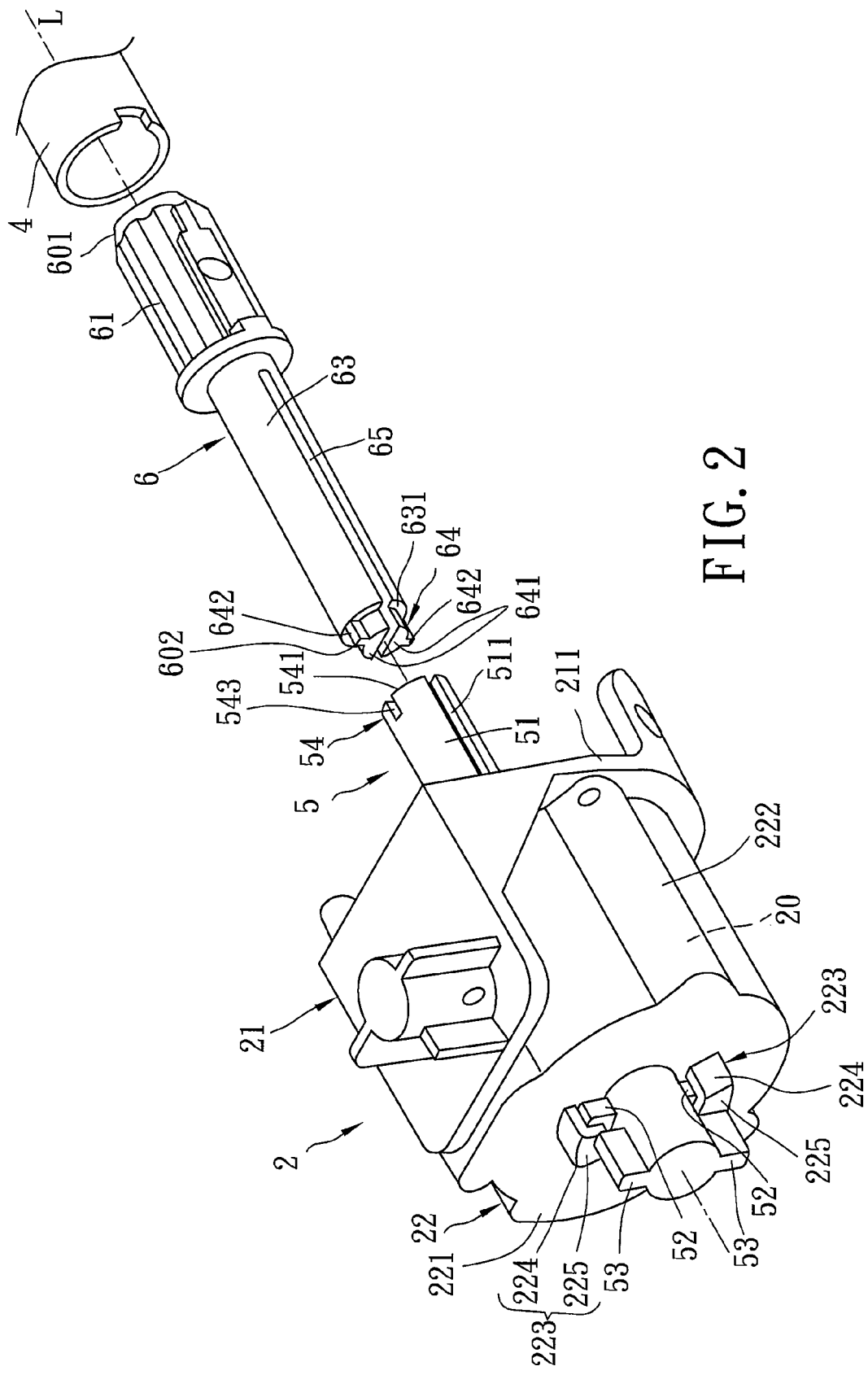
FIG. 2 is a partly exploded perspective view of the preferred embodiment.
Figure 3:
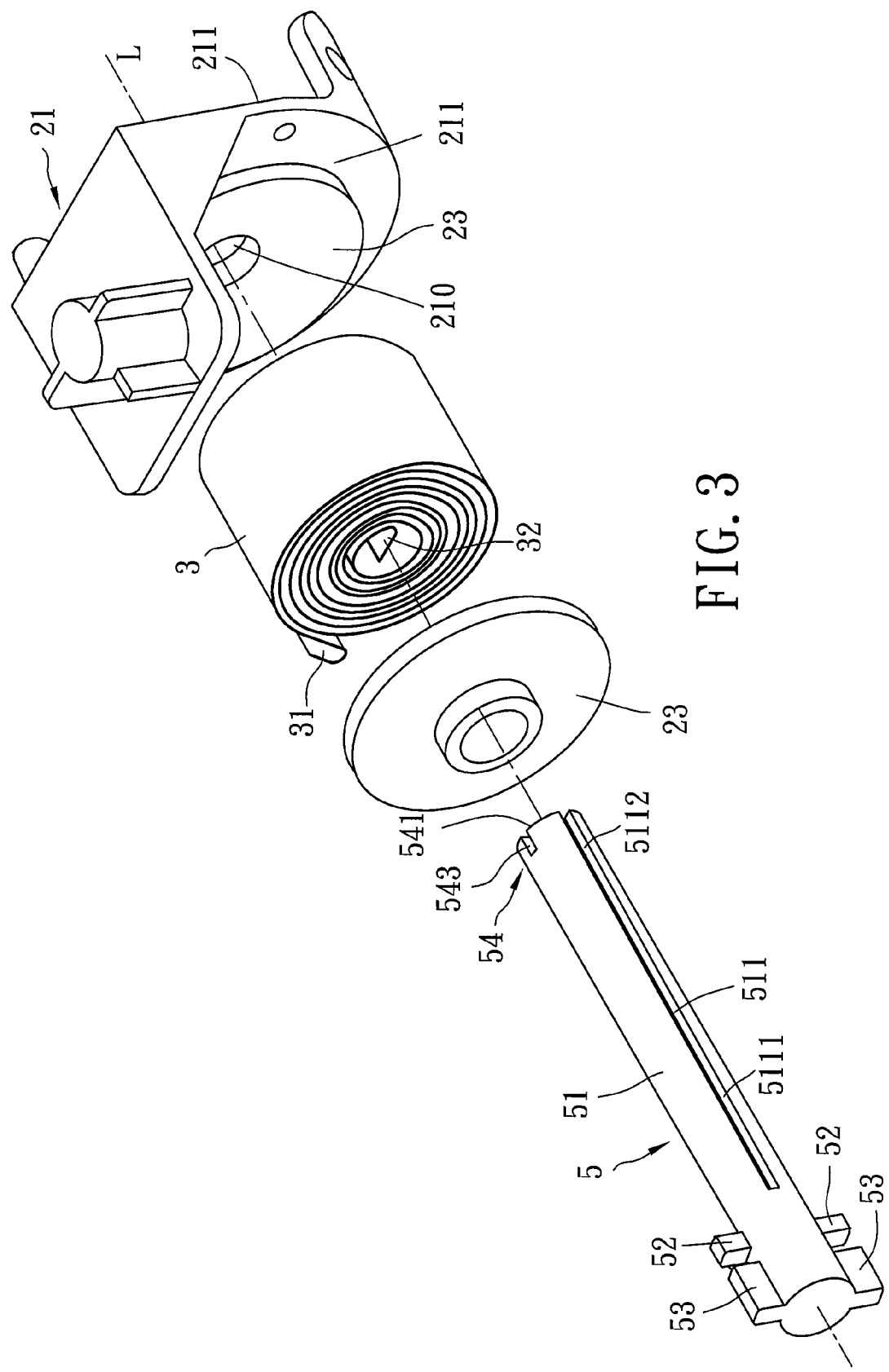
FIG. 3 is an exploded perspective view of a spring drive unit of the preferred embodiment.
Figure 4:
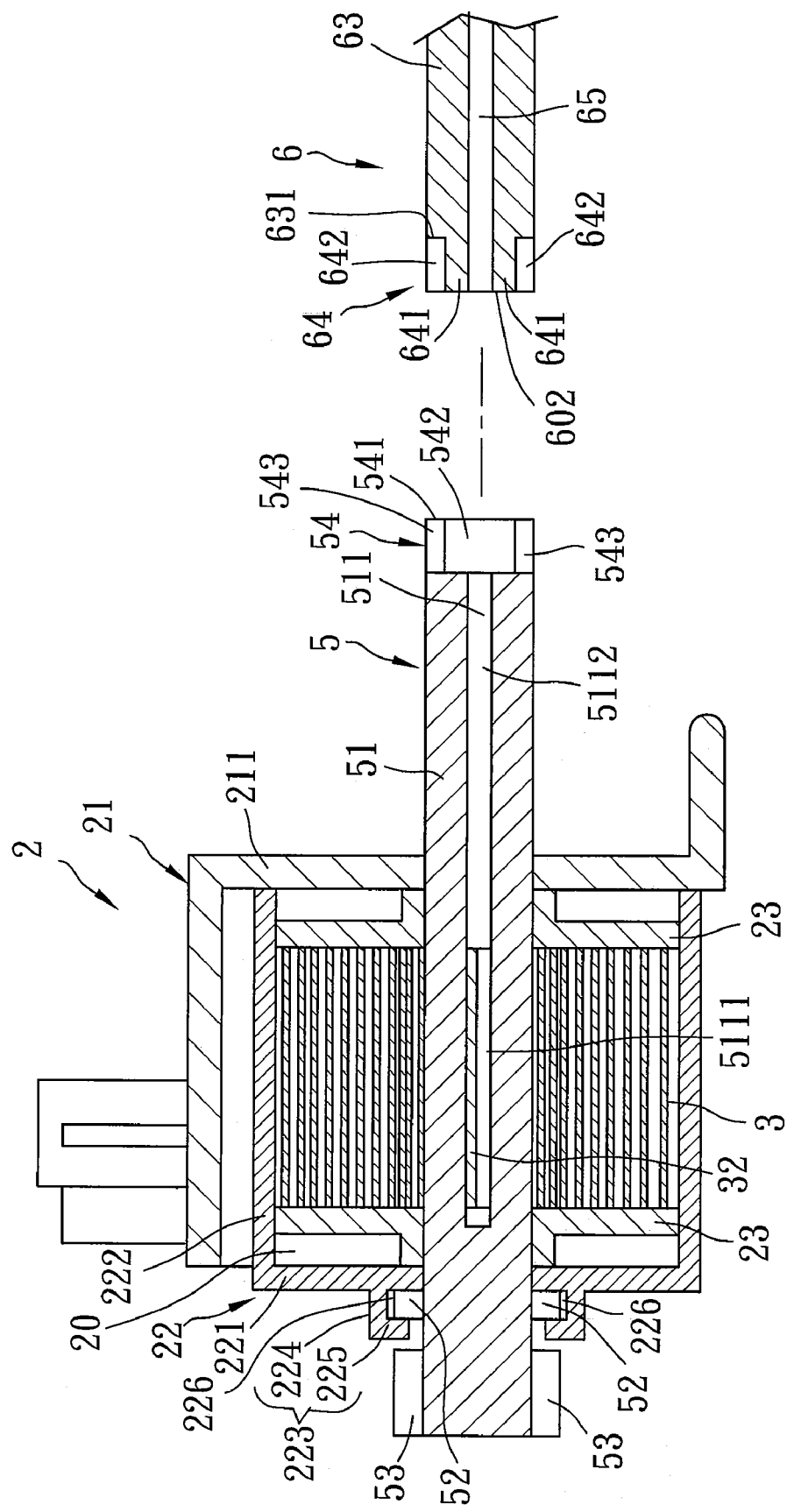
FIG. 4 is a fragmentary partly exploded sectional view of the preferred embodiment.

Referring to FIGS. 1 to 4, the preferred embodiment of a spring drive device according to the present invention is adapted for use in an automatic winding-up sunshade assembly. The sunshade assembly includes a hollow winding shaft 4 extending along an axis (L), a stationary seat 11 connected to an end of the winding shaft 4, a shade member 12 wound on and having one end connected to the winding shaft 4, and a coupling shaft 6 for connecting an opposite end of the winding shaft 4 to the spring drive device. The spring drive device comprises a shell unit 2, a spring member 3, and a connecting shaft 5.

The shell unit 2 includes a shell body 22 and a base seat 21. The shell body 22 includes an outer side wall 221 that is normal to the axis (L), and a surrounding wall 222 that extends in the axis direction from a periphery of the outer side wall 221 to terminate at a peripheral end so as to define a retaining space 20 extending along the axis (L). In this embodiment, the shell body 22 further includes a pair of spaced-apart retaining members 223 provided on the outer side wall 221. Each of the retaining members 223 includes an extending wall 224 extending in the direction of the axis (L) away from the retaining space 20, and a grip wall 225 projecting from the extending wall 224 and spaced apart from the outer side wall 221 axially to define an angularly extending groove 226 (see FIGS. 4 and 7). The base seat 21 includes an inner side wall 211 that is normal to the axis (L), and that has an enclosing portion 2111 extending from the peripheral end of the surrounding wall 222 in radial directions and toward the axis (L) to form an entry opening 210 (see FIG. 3).

In this embodiment, the spring member 3 is a coil spring that is disposed in the retaining space 20 between the inner side wall 211 of the base seat 21 and the outer side wall 221 of the shell body 22, and that has a first segment 31 connected to the shell body 22, and a second segment 32 spaced inwardly and radially apart from the first segment 31. The shell unit 2 further includes a pair of axially spaced-apart securing plates 23 that are disposed in the retaining space 20 to flank the spring member 3 so as to restrain axial movement of the spring member 3 in the retaining space 20.

The connecting shaft 5 includes a shaft body 51 that has a central part, and outer and inner ends connected to opposite sides of the central part in a longitudinal direction. The shaft body 51 is formed with a first positioning section 54 at the inner end that is engageable with the coupling shaft 6, and a guideway 511 having an initial region 5111 and extending longitudinally from the initial region 5111 to terminate at a relay region 5112. In this embodiment, the connecting shaft 5 further includes a pair of spaced-apart retained portions 52 disposed to extend radially from the outer end thereof, and a pair of access portions 53 disposed to extend radially from the outer end thereof and spaced longitudinally and respectively apart from the retained portions 52.

The coupling shaft 6 is formed with a coupling end 601 and an engaging end 602 longitudinally opposite to each other. The coupling shaft 6 has an insert section 61 formed at the coupling end 601, a second positioning section 64 formed at the engaging end 602 that is engageable with the first positioning section 54 of the connecting shaft 5, a connecting section 63 interconnecting the insert section 61 and the second positioning section 64, and a guided path 65 extending longitudinally from the engaging end 602 toward the coupling end 601. In this embodiment, the guided path 65 extends longitudinally from the second positioning section 64 to the connecting section 63.

In this embodiment, the first positioning section 54 of the connecting shaft 5 has an abutment surface 541 confronting the engaging end 602 of the coupling shaft 6 in the longitudinal direction, a longitudinally-extending coupling hole 542 formed in the abutment surface 541, and a pair of diametrically-opposite positioning grooves 543 extending radially from the coupling hole 542 through an outer surface of the shaft body 51. The guideway 511 extends through the abutment surface 541. The connecting section 63 of the coupling shaft 6 has a contact surface 631 which confronts the first positioning section 54 of the connecting shaft 5 and through which the guided path 65 extends. The second positioning section 64 includes a pair of coupling members 641 extending longitudinally from the contact surface 631 and separated from each other by the guided path 65, and a pair of semicylindrical positioning members 642 projecting radially, outwardly and respectively from the coupling members 641.

Figure 5:
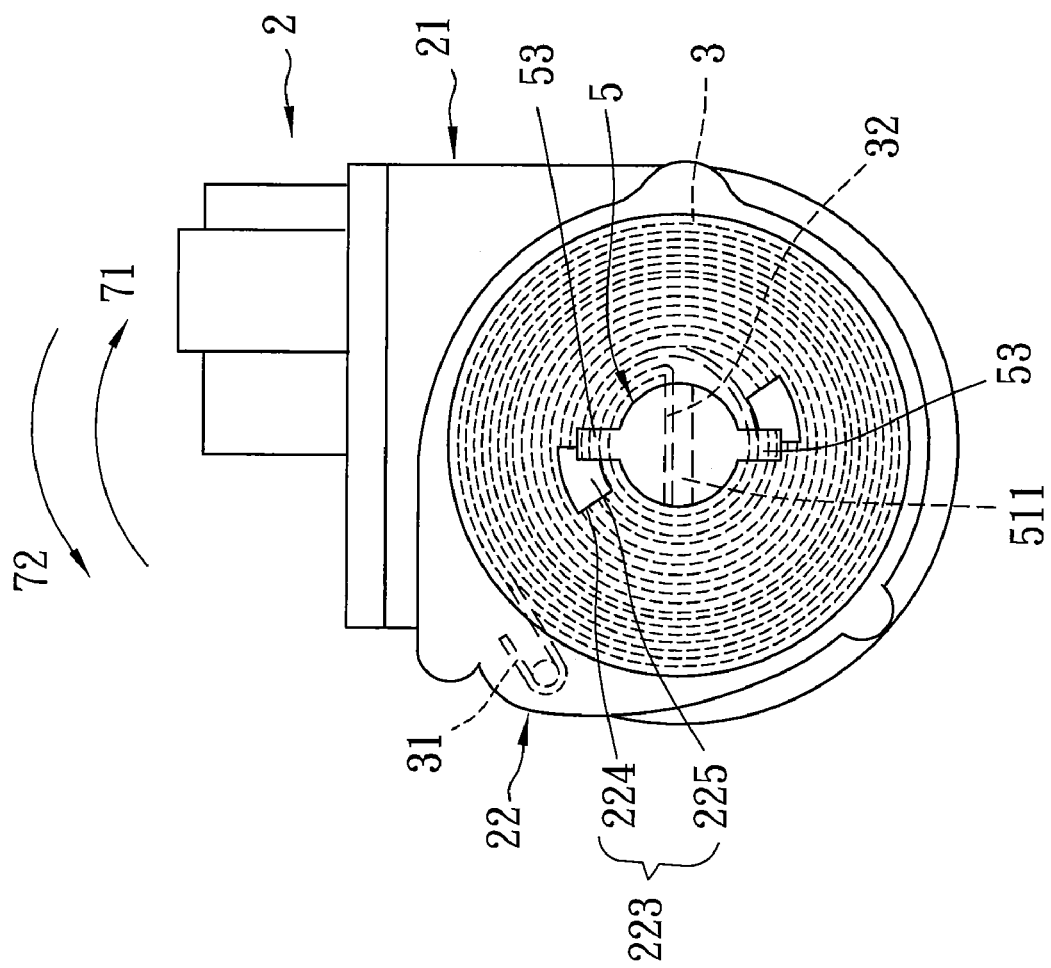
FIG. 5 is a sectional view of the preferred embodiment, illustrating a connecting shaft at a locked position.
Figure 6:
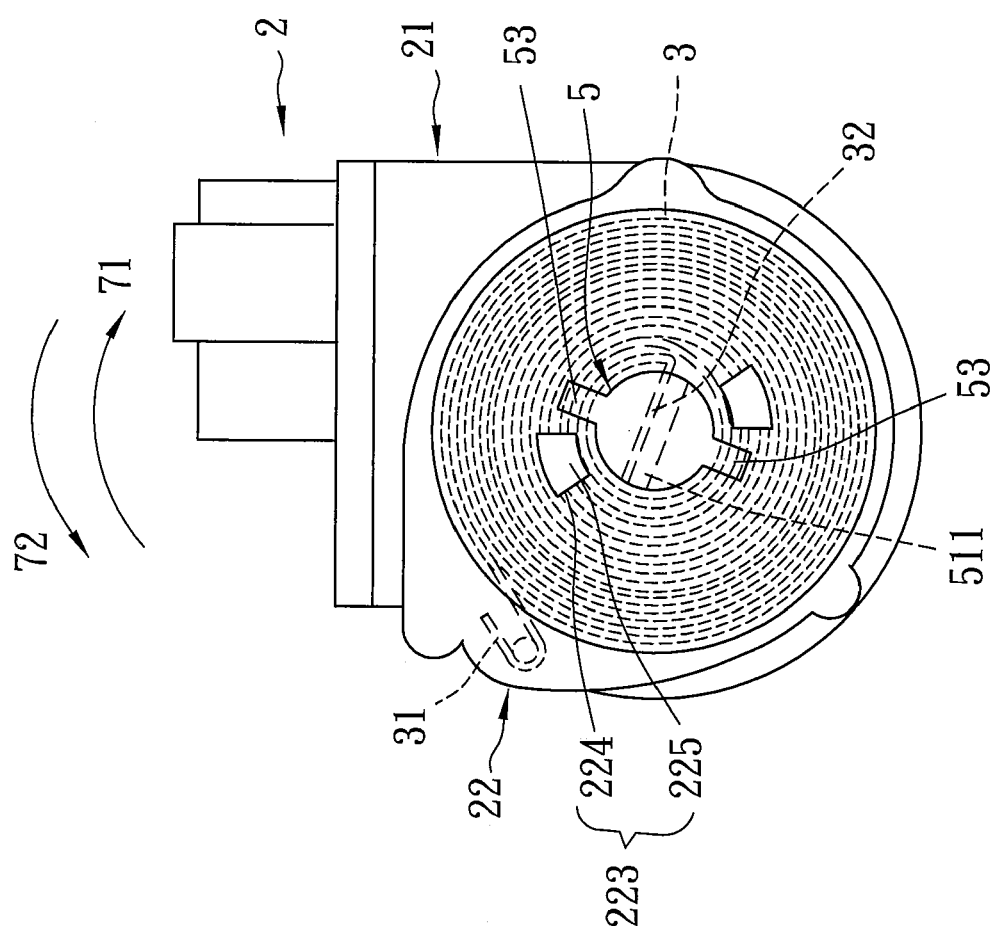
FIG. 6 is a view similar to FIG. 5, but illustrating the connecting shaft at an unlocked position.

To mount the assembly of the shell unit 2 and the spring member 3 to the winding shaft 4, the connecting shaft 5 has to be first moved along the axis (L) to extend through the shell unit 2 with the initial region 5111 of the guideway 511 slidably engaged with the second segment 32 of the spring member 3. The presence of the entry opening 210 in the inner side wall 211 permits passage of the inner end of the shaft body 51 during the axial movement of the connecting shaft 5. Further referring to FIGS. 5 and 6, the connecting shaft 5 is then rotated in a first rotational direction 71 for several turns so as to twist the spring member 3 to have a restoring force stored therein. Afterward, the connecting shaft 5 is held to be non-rotatable and further moved axially to a position where the retained portions 52 are engageable with the retaining members 223 of the shell body 22 before the connecting shaft 5 is released. When the connecting shaft 5 is released, the restoring force of the spring member 3 automatically urges the shaft body 51 of the connecting shaft 5 to rotate in a second rotational direction 72 opposite to the first rotational direction 71 to a locked position (see FIGS. 4 and 5), where the retained portions 52 are brought to be fitted respectively in the angularly extending grooves 226, such that the axial movements of the retained portions 52 away from the outer side wall 221 are arrested due to the grip walls 225 and the outer side wall 221, and that further rotations of the retained portions 52 in the second rotational direction 72 are blocked by the extending walls 224.

Before the coupling shaft 6, with the insert section 61 coupled co-rotatably to the winding shaft 4, is connected to the base seat unit 2 and the spring member 3, the access portions 53 have to be rotated slightly in the first rotational direction 71 to displace angularly the shaft body 51 from the locked position to an unlocked position (see FIG. 6), where the retained portions 52 are disengaged respectively from the angularly extending grooves 226. The second positioning section 64 of the coupling shaft 6 is then engaged with the first positioning section 54 of the connecting shaft 5 such that the coupling members 641 are fitted in the coupling hole 542 and the positioning members 642 engage respectively the positioning grooves 543 so as to form a spline structure in which the first positioning section 54 is configured as a mated part while the second positioning section 64 is configured as a mating part, that the abutment surface 541 abuts against the contact surface 631, and that the guided path 65 is aligned with the guideway 511.

Figure 7:
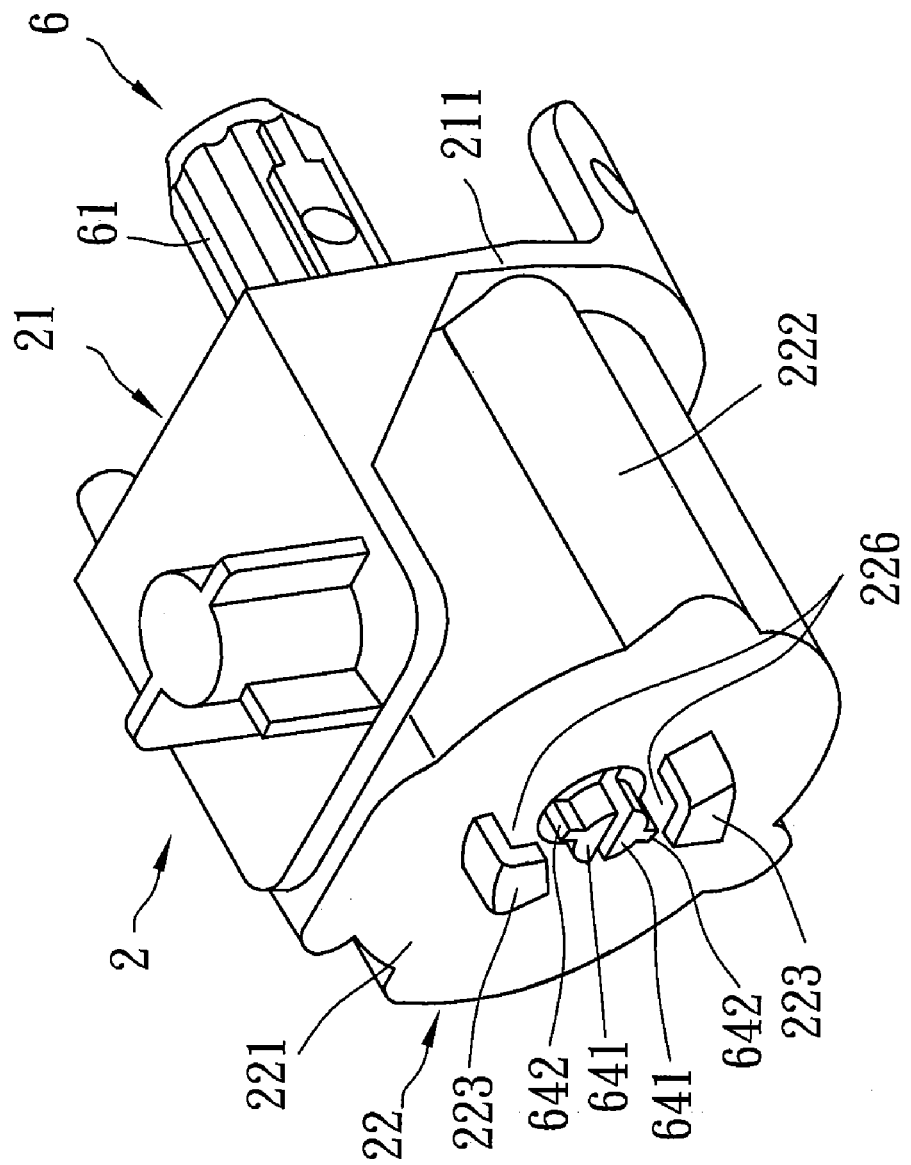
FIG. 7 is a perspective view of the preferred embodiment, illustrating a base seat unit coupled with a coupling shaft.

In the next step, the coupling shaft 6 is pushed to move the connecting shaft 5 axially relative to the retaining space 20 along a coupling route, while the guideway 511 is kept in slidable engagement with the second segment 32 of the spring member 3 until the relay region 5112 of the guideway 511 reaches the second segment 32. As pushing of the coupling shaft 6 is kept continued, the axial movement of the connecting shaft 5 is continued after the relay region 5112 reaches the second segment 32, such that the guided path 65 is brought to take over the slidable engagement with the second segment 32 from the relay region 5112 while the guided path 65 retrieves the coupling route. Finally, the connecting shaft 5 is moved to be completely separated from the base seat unit 2, and the engaging end 602 of the coupling shaft 6 extends outwardly of the outer side wall 221, as illustrated in FIG. 7, and is positioned relative to the base seat unit 2, thereby placing such an automatic winding-up subassembly in a working position where the shade member 12 is biased by the spring member 3 toward a rolled-up state.

To sum up, the spring drive device of the present invention can be easily mounted to the winding shaft 4 and the shade member 12 by virtue of the above-mentioned procedure to replace the connecting shaft 5 with the coupling shaft 6. Moreover, compared to the coupling shaft of the conventional spring drive assembly disclosed in U.S. Pat. No. 7,694,712 B2, the coupling shaft 6 can be coupled co-rotatably to the winding shaft 4 without the use of the bushing, thereby resulting in a simpler structure and a lower manufacturing cost of the present invention.

It should be noted that the configurations of the first positioning section 54 and the second positioning section 64 in the spline structure may be interchanged in other embodiments of this invention, i.e., the first positioning section 54 may be configured as a mating part while the second positioning section 64 may be configured as a mated part. Moreover, while this invention is exemplified using a pair of positioning grooves 543 and a pair of positioning members 642 corresponding to the positioning grooves 543, only one positioning groove 543 and one positioning member 642 may be employed in other embodiments of this invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A spring drive device adapted for use in a sunshade assembly, the sunshade assembly including a winding shaft, a shade member that is wound on the winding shaft, and a coupling shaft that has a coupling end coaxial to and rotatable with the winding shaft, and an engaging end opposite to the coupling end, and that is formed with a guided path extending longitudinally from the engaging end toward the coupling end, said spring drive device comprising:
   a shell unit defining a retaining space that extends along an axis, and including an outer side wall;
   a spring member disposed in said retaining space, and having a first segment that is connected to said shell unit, and a second segment that is inwardly and radially spaced apart from said first segment; and
   a connecting shaft including a shaft body which has a central part disposed in said retaining space, an outer end extending outwardly of said outer side wall of said shell unit, and an inner end that is longitudinally opposite to said outer end, said shaft body being formed with a positioning section at said inner end, and a guideway which has an initial region that is slidably engaged with said second segment, and which extends longitudinally from said initial region to terminate at a relay region, such that when said shaft body is moved axially along a coupling route in a direction of the axis, said guideway is kept in slidable engagement with said second segment until said relay region reaches said second segment, said shaft body being angularly displaceable relative to the axis between an unlocked position, where said shaft body is permitted to move axially along the coupling route, and a locked position, where the axial movement of said shaft body is arrested, said positioning section of said connecting shaft being adapted to be engageable with the engaging end of the coupling shaft to align the guided path of the coupling shaft with said guideway such that when the axial movement of said shaft body is continued after said relay region reaches said second segment, the guided path is brought to take over the slidable engagement with said second segment from said relay region while the guided path retrieves said coupling route;
   wherein said shell unit further includes a retaining member disposed on said outer side wall for retaining said outer end of said shaft body at the locked position.

2. The spring drive device as claimed in claim 1, wherein said shell unit includes:
   a surrounding wall that extends in the axis direction from a periphery of said outer side wall to terminate at a peripheral end so as to define said retaining space; and
   an inner side wall which extends from said peripheral end in radial directions and toward the axis to form an entry opening that is configured to permit said inner end of said shaft body to pass through during the axial movement of said connecting shaft.

3. The spring drive device as claimed in claim 1, wherein said shell unit further includes a pair of axially spaced-apart securing plates that are disposed to flank said spring member so as to restrain axial movement of said spring member in said retaining space.

4. The spring drive device as claimed in claim 1, wherein said connecting shaft further includes a retained portion disposed to extend radially from said outer end thereof, said retained portion being configured to be engaged with and blocked by said retaining member from movement away from said outer side wall in the locked position.

5. The spring drive device as claimed in claim 4, wherein said retaining member of said shell unit includes a grip wall which is disposed to be spaced apart from said outer side wall axially to define an angularly extending groove such that when said shaft body is angularly displaced to the locked position, said retained portion is brought to be fitted in said angularly extending groove.

6. The spring drive device as claimed in claim 1, wherein:
   said positioning section of said shaft body of said connecting shaft has an abutment surface adapted to confront the engaging end of the coupling shaft in the longitudinal direction; and
   said guideway of said shaft body of said connecting shaft is configured to extend longitudinally through said abutment surface.

7. The spring drive device as claimed in claim 6, wherein said positioning section of said shaft body is configured to be a mated part of a spline structure which is adapted to be fitted with a mating part of the spline structure formed in the engaging end of the coupling shaft.

8. An automatic winding-up subassembly adapted for use in a sunshade assembly, the sunshade assembly including a shade member and a connecting shaft, the connecting shaft including a shaft body which has outer and inner ends opposite to each other in a longitudinal direction, and which is formed with a positioning section at the inner end, and with a guideway that has initial and relay regions opposite to each other lengthwise, said automatic winding-up subassembly comprising:
   a winding shaft adapted for winding of the shade member;
   a shell unit defining a retaining space that extends along an axis and including an outer side wall;
   a spring member disposed in said retaining space, and having a first segment which is connected to said shell unit, and a second segment which is inwardly and radially spaced apart from said first segment, and which is adapted to be slidably engaged with the initial region, and which is kept in slidable engagement with said guideway until the relay region reaches said second segment when the shaft body is moved axially relative to said retaining space along a coupling route in a direction of the axis; and
   a coupling shaft having a coupling end which is disposed coaxial to and rotatable with said winding shaft, and an engaging end which is opposite to said coupling end, and which is adapted to be engageable with the positioning section, said coupling shaft being configured to have a guided path which extends from said engaging end toward said coupling end, and which is adapted to be brought into alignment with the guideway when said engaging end is engaged with the positioning section, such that, when the axial movement of the shaft body is continued after the relay region reaches said second segment, said guided path is brought to take over the slidable engagement with said second segment from the relay region while said guided path retrieves said coupling route until said engaging end extends outwardly of said outer side wall thereby placing said automatic winding-up subassembly in a working position where the shade member is biased by said spring member toward a rolled-up state.

9. The automatic winding-up subassembly as claimed in claim 8, wherein said engaging end of said coupling shaft is configured to be a mating part of a spline structure which is adapted to be fitted with a mated part of the spline structure formed in the positioning section of the shaft body of the connecting shaft.

10. The automatic winding-up subassembly as claimed in claim 8, wherein said shell unit includes:
   a surrounding wall that extends in the axis direction from a periphery of said outer side wall to terminate at a peripheral end so as to define said retaining space; and
   an inner side wall which extends from said peripheral end in radial directions and toward the axis to form an entry opening that is configured to permit said engaging end of said coupling shaft to pass through during the axial movement of said coupling shaft.

* * * * *